United States Patent Office 3,682,903
Patented Aug. 8, 1972

3,682,903
CEPHALOSPORANIC ACID DERIVATIVES AND PROCESS FOR THEIR MANUFACTURE
Hans Bickel, Binningen, Rolf Bosshardt, Arlesheim, Bruno Fechtig, Binningen, Johannes Mueller, Arlesheim, and Heinrich Peter, Riehen, Switzerland, assignors to Ciba-Geigy Corporation, Ardsley, N.Y.
No Drawing. Filed Oct. 28, 1968, Ser. No. 771,330
Claims priority, application Switzerland, Nov. 3, 1967, 15,418/67
Int. Cl. C07d 99/24
U.S. Cl. 260—243 C          5 Claims

ABSTRACT OF THE DISCLOSURE

Process for the manufacture of 3-formyl-7-acylamino (or 7-amino)-ceph-2-em-4-carboxylic acids, wherein 3-hydroxymethyl-7-acylamino (or 7-amino) - ceph - 2 - em-carboxylic acids are oxidized.

---

The present invention provides a new process for the manufacture of cephalosporanic acid derivatives, namely of 3-desacetoxymethyl-3-formyl - 7 - amino - isocephalosporanic acid (3-formyl-7-amino-ceph-2-em-4-carboxylic acid) and of its 7-acyl derivatives of the formula (I)
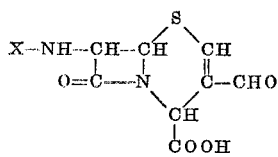

in which X represents a hydrogen atom or an acyl radical, and of their salts.

It is known that these compounds can be obtained by total synthesis (cf. Belgian specification 868,670). It is also known to oxidize O-desacetyl - 7 - acylamino-cephalosporanic acid esters to the corresponding 3-formyl compounds (cf. Chamberlin et al., J. Med. Chem. 10, 967 [1967]) but it is not possible to arrive at the free 4-carboxylic acid by this route, nor can the esters subsequently be converted into the free 4-carboxylic acids.

The present invention is based on the unexpected observation that the compounds of the Formula I can be prepared directly by oxidizing a compound of the formula (II)
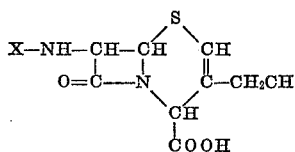

in which X has the above meaning. Accordingly, the present process is characterized in that in a compound of the Formula II the hydroxymethyl group is oxidized to the formyl group and, if desired, the resulting compound of the Formula I, in which X represents hydrogen, is acylated.

The oxidation according to this invention is advantageously performed with the aid of oxidants suitable for the oxidation of primary alcohols, especially $\alpha,\beta$-unsaturated alcohols, to aldehydes, without oxidizing the sulphur atom of the dihydrothiazine ring. There may be used, for example, the agents preferably used for this purpose, for example chromic acid, manganese dioxide, nickel peroxide, silver carbonate on an inert carrier, for example diatomaceous earth, N-bromoacetamide, N-bromosuccinimide, 2,3,5,6-tetrachloro-1,4-benzoquinone and above all 2,3-dichloro-5,6-dicyano-1,4-benzoquinone.

The reaction is performed in an inert solvent, for example in dioxane, tetrahydrofuran, dimethylsulphoxide, or ethyl acetate, or in a chlorinated hydrocarbon such as chloroform or methylenechloride, preferably at room temperature or a temperature up to 100° C.

The compounds of the Formula II, used as starting materials, are obtained in very good yield by microbiological desacetylation of the corresponding isocephalosporanic acids with the microorganisms known for the desacetylation of cephalosporanic acids, such as those mentioned in British specification 1,080,904, for example Bacillus subtilis ATCC 6633. That the microorganisms are also suitable for the desacetylation of the isocephalosporanic acids, was unexpected since these acids probably have a configuration substantially different from that of the cephalosporanic acids (see Abraham, Quarterly Rev. 21,239 [1967]). The manufacture of the compounds of the Formula II by means of the above-mentioned microorganisms is likewise included in the present invention.

In the compounds of the Formula II, used as starting materials, the acyl radical X is the residue of an aliphatic, aromatic, heterocyclic, araliphatic or heterocyclyl-aliphatic carboxylic acid or a residue derived from carbonic acid, for example the tertiary butyloxycarbonyl residue. The residue X is expecially the acyl residue of a 7-acyamino-cephalosporanic acid known to be active, such as a residue of the formula $R_2(CH_2)_nCO$, in which $n$ is a whole number from 0 to 4, preferably 1, and a $CH_2$ group which may be substituted by an amino or cyano group, a free or esterified carboxyl group, an esterified hydroxyl group or a carbamoyl group, and $R_2$ represents an aryl, aryloxy, arylthio, cycloalkyl, cycloalkoxy, heterocyclyl, heterocyclyloxy or heterocyclylthio residue, all of which may be unsubstituted or substituted, being, for example, 2,6-dimethoxybenzoyl, tetrahydronaphthoyl, 2-methoxynaphthoyl, 2-ethoxynaphthoyl, phenylacetyl, phenoxyacetyl, S-phenylthioacetyl, S-bromophenylthioacetyl, $\alpha$-phenoxypropionyl, $\alpha$ - phenoxyphenylacetyl, $\alpha$ - methoxyphenylacetyl, $\alpha$-methoxy-3,4-dichlorophenylacetyl, $\alpha$ - cyanophenylacetyl, benzyloxycarbonyl, S-benzylthioacetyl, S-benzylthiopropionyl, hexadhydrobenzyl - oxycarbonyl, cyclopentanoyl, 2-thienylacetyl, $\alpha$-cyano-2-thienylacetyl, 3-thienylacetyl, 2-furylacetyl, 2-phenyl-5-methyl-isoxazolylcarbonyl, 2-(2'-chlorophenyl)-5-methyl - isoxazolylcarbonyl, or a residue of the formula $$C_nH_{2n+1}CO \text{ or } C_nH_{2n-1}CO$$

where $n$ is a whole number from 1 to 7 and the chain may be linear or branched, and may be interrupted by an oxygen or a sulphur atom or substituted by halogen, trifluoromethyl, cyano, amino, nitro or carboxyl, being, for example propionyl, butyryl, hexanoyl, octanoyl, butylthioacetyl, acrylyl, crotonyl, 2-pentenoyl, allylthioacetyl, chloroacetyl, $\beta$-bromopropionyl, aminoacetyl, $\alpha$-carboxypropionyl, cyanoacetyl, $\alpha$-cyano-$\beta$-dimethylacroyl, or a residue of the formula R—NH—CO— in which R represents an unsubstituted or substituted aromatic or araliphatic hydrocarbon residue, especially a lower alkyl radical substituted by lower alkoxy groups and/or halogen atoms.

The free acids may be converted in known manner into corresponding salts. These salts are either metal salts, above all those of therapeutically acceptable alkali or alkaline earth metals, such as sodium, potassium or calcium, or salts with organic bases, for example with triethylamine, N - ethylpiperidine, dibenzylethylenediamine or procain.

The final products of the Formula I display an antibacterial activity as can be shown, for example, in in-vitro experiments. Inter alia, for example, they act against Staphylococcus aureus. They may therefore be used for combating infections caused by such microorganisms;

they are also suitable as additives to animal fodder, for preserving foodstuffs or as disinfectants. They may also be used as intermediates in the manufacture of other derivatives of isocephalosporanic acid as described, for example, in patent applications 14,008/67, 14,009/67 or 14,101/67 or in French specification 1,495,049, and of corresponding derivatives of cephalosporanic acid. The isomerization leading to the cephalosporanic acid derivatives is carried out, for example, by the process of French specification 1,495,049 by treatment with a weak basic agent.

The new acids and their salts may be used as medicaments, for example in the form of pharmaceutical preparations containing these compounds in conjunction or admixture with an organic or inorganic, solid or liquid pharmaceutical excipient suitable for enteral, local or parenteral administration. Suitable excipients are substances that do not react with the new compounds, for example water, gelatin, lactose, starches, stearyl alcohol, magnesium stearate, talcum, vegetable oils, benzyl alcohols, gums, propyleneglycol, polyalkyleneglycols, white petroleum jelly, cholesterol or other known medicinal excipients. The pharmaceutical preparations may be, for example, tablets, dragées, ointments, creams or capsules, or in liquid form solutions, suspensions or emulsions. They may be sterilized and/or may contain assistants such as preserving, stabilizing, wetting or emulsifying agents, solution promoters, salts for regulating the osmotic pressure or buffers. They may also contain further therapeutically valuable substances. The preparations are formulated by known methods.

The following example illustrates the invention without restricting its scope. Thin-layer chromatography on silica gel was performed with the use of the following solvent systems:

System 52: n-butanol+glacial acetic acid+water (75:7.5:21)
System 67: n-butanol+ethanol+water (40:10:50)
System 92: n-butanol+glacial acetic acid+water (40:10:40)

EXAMPLE

A solution of 2.79 g. (8.0 mmols.) of 3-hydroxymethyl - 7 - phenylacetylamino-ceph-2-em-4-carboxylic acid in 85 ml. of absolute dioxan is mixed with 2.29 g. (10.0 mmols.) of 2,3-dichloro-5,6-dicyano - 1,4 - benzoquinone. The clear reaction mixture is left to stand for 20 hours at 45° C. and then kept for 2 hours at about 5° C. 2,3-dichloro-5,6-dicyanohydroquinone precipitates in the form of crystal flakes which are filtered off, the filtrate is evaporated to dryness under vacuum, the residue taken up in a small quantity of ethyl acetate and the solution is filtered.

The ethyl acetate solution is diluted to 240 ml. and, while being cooled, extracted once with 120 and then with 2× 90 ml. of 0.5 molar dibasic potassium phosphate solution. The aqueous phases are washed further with 2× 150 ml. of ethyl acetate, covered with 250 ml. of icecold ethyl acetate and, while stirring thoroughly, the pH value is adjusted to 2.1 with concentrated phosphoric acid. The aqueous phase is separated, saturated with sodium chloride and washed with 150 ml. and then with 130 ml. of ethyl acetate. The organic extracts are washed with 4× 70 ml. of saturated sodium chloride solution, dried with sodium sulphate and evaporated, to leave 3.76 g. of an amorphous product which according to its thin-layer chromatogram is almost unitary. This residue is chromatographed on 180 g. of silica gel G (Merck). A mixture of methylenechloride and ethyl acetate (4:1 parts by volume) elutes 1.5 g. of 3-formyl-7-phenylacetyl-amino-ceph-2-em-4-carboxylic acid which, according to its thin-layer chromatogram, is pure. $Rf_{52}=0.39$, $Rf_{67}=0.27$, $Rf_{92}=0.53$. By means of repeated column chromatography another 0.663 g. of pure product are isolated from the impure fractions. The substance crystallized from methanol+methylenechloride with occlusion of methanol (according to equivalent weight and nuclear resonance spectrum). M.P. 137.5–138.5° C. UV-spectrum in 95% ethanol: $\lambda_{max}=288$ m$\mu$ ($\epsilon=18,850$) $\lambda_{max}=246$ m$\mu$ ($\epsilon=2,075$). (The $\epsilon$-values have been corrected according to the equivalent weight of 389.09.) Optical rotation: $[\alpha]_D^{20}=+580\pm1°$ (c.=1.168% in dioxan).

The starting material may be prepared thus: 3.40 grams (8.7 mmols.) of 3-acetoxymethyl-7-phenylacetylamino-ceph-2-em-4-carboxylic acid are suspended in 70 ml. of distilled water. While stirring with a vibro mixer the pH value is adjusted to 7.3 by adding normal sodium hydroxide solution. The solution is heated in a thermostat-controlled bath to 35° C. and incubated with 400 mg. of cell lyophilizate of Bacillus subtilis ATCC 6633 in 3 ml. of water. The pH value of the bath is kept constant at 7.4 by adding normal sodium hydroxide solution, and the alkali consumption is periodically determined.

After about 2½ hours half the theoretically calculated consumption of sodium hydroxide solution has been reached. The batch is allowed to complete the reaction until no more hydroxide solution is consumed and the pH value of the reaction solution remains constant even when it is allowed to stand for several hours at room temperature.

For working up the batch is covered with 300 ml. of cooled ethyl acetate and, while stirring well, acidified to pH 2.0. The whole is allowed to separate into two layers and the aqueous phase is saturated with sodium chloride and further extracted with 2× 250 ml. of cold ethyl acetate. The organic phases are washed with 5× 60 ml. of saturated sodium chloride solution, dried over sodium sulphate and evaporated. The residue of 2.974 g. of chromatographically pure product corresponds to a yield of 98.3% of the theoretical. After several crystallizations from ethyl acetate+cyclohexane there are obtained 2.884 g. of white needles (=95.3%) which melt at 156–156.5° C.

We claim:

1. Process for the manufacture of a 3-desacetoxy-methyl-3-formyl-7-amino-isocephalosporanic acid of the Formula I (I) 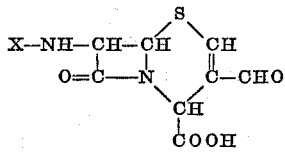

in which X represents a hydrogen atom or an acyl group derived from a carboxylic or carbonic acid and selected from the group consisting of (1) a group of the formula $R_2(CH_2)_nCO$ selected from the group consisting of 2,6-dimethoxybenzoyl, tetrahydronaphthoyl, 2-methoxynaphthoyl, 2-ethoxynaphthoyl, phenylacetyl, phenoxyacetyl, S-phenylthioacetyl, S-bromophenylthioacetyl, α-phenoxypropionyl, α-phenoxyphenylacetyl, α-methoxyphenylacetyl, α-methoxy-3,4-dichlorophenylacetyl, α-cyanophenylacetyl, benzyloxycarbonyl, S-benzylthioacetyl, S-benzylthiopropionyl, hexahydrobenzyloxycarbonyl, cyclopentanoyl, 2-thienylacetyl, α-cyano-2-thienylacetyl, 3-thienylacetyl, 2-furylacetyl, 2-phenyl-5-methyl-isoxazolylcarbonyl, 2-(2'-chlorophenyl)-5-methyl-isoxazolylcarbonyl and said groups in which the alkylene portion is substituted by a member selected from the group consisting of amino, cyano, carboxy, methoxy, phenoxy, and carbamoyl, (2) a group of the formulae $C_nH_{2n+1}CO$ and $C_nH_{2n-1}CO$, in which $n$ is a whole number from 1 to 7, $C_nH_{2n+1}$ and $C_nH_{2n-1}$ are each unsubstituted, interrupted by an oxygen or sulfur atom or substituted by a member selected from the group consisting of halogen, trifluoromethyl, cyano, amino, nitro or carboxyl and (3) a group of the formula R—NH—CO—, in which R is unsubstituted or lower alkoxy- or halo-substituted mono- or bi-cyclic aromatic or mono- or bi-cyclic araliphatic hydrocarbon or lower alkyl, or a therapeutically acceptable salt thereof, wherein in a compound of the Formula II (II) 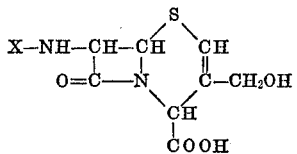

in which X has the meaning given above, the hydroxymethyl group is oxidized to the formyl group by means of an oxidant suitable for the oxidation of a primary α,β-unsaturated alcohols to aldehydes.

2. Process according to claim 1, wherein the oxidation is performed with a 2,3-dichloro-5,6-dicyano-1,4-benzoquinone.

3. Process according to claim 1, wherein the reaction is performed in an inert solvent.

4. Process according to claim 1, wherein the starting material is a compound of the Formula II in which X stands for the acyl residue of a carboxylic acid.

5. Process according to claim 1, wherein the starting material is a compound of the Formula II in which X stands for the phenylacetyl radical.

References Cited
UNITED STATES PATENTS 3,351,596   9/1966   Chamberlin _____ 260—243

OTHER REFERENCES

Chamberlin et al., J. Med. Chem. 10, 966–968 (1967).

NICHOLAS S. RIZZO, Primary Examiner

U.S. Cl. X.R.

424—246